United States Patent Office 3,514,751
Patented May 26, 1970

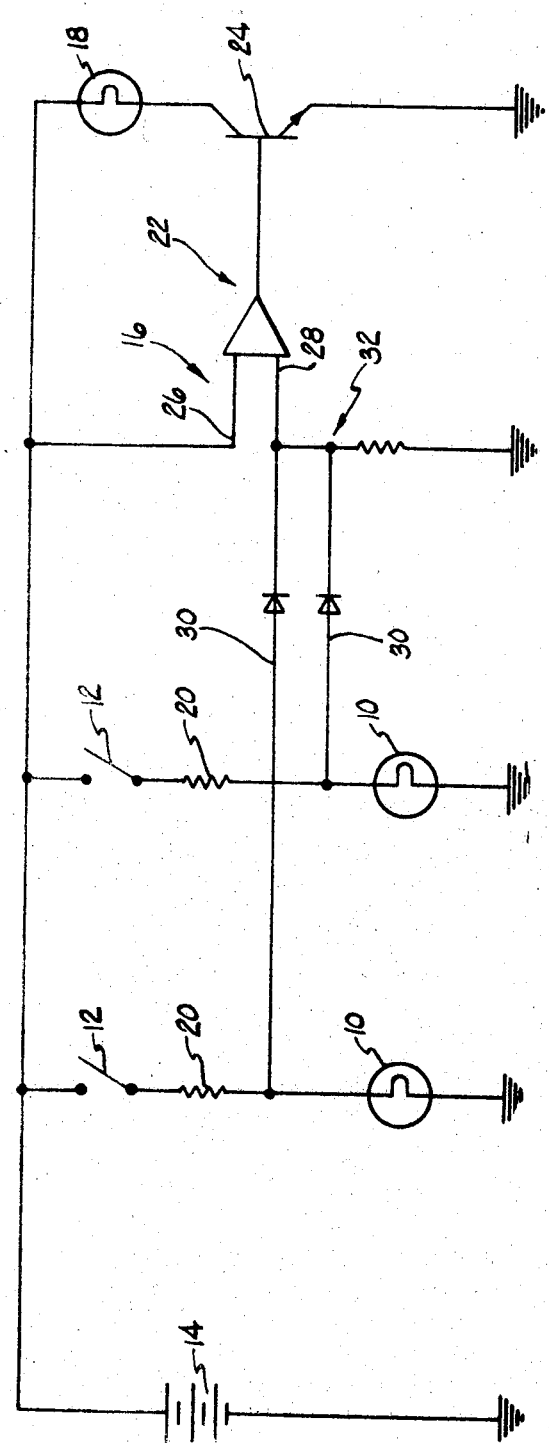

3,514,751
LAMP OUTAGE INDICATING APPARATUS
Joseph E. Pascente, Norridge, Ill., assignor to Grigsby-Barton, Inc., Arlington Heights, Ill., a corporation of Illinois
Filed Dec. 9, 1966, Ser. No. 600,449
Int. Cl. B60q 9/00
U.S. Cl. 340—52                                 2 Claims

ABSTRACT OF THE DISCLOSURE

An electrical system indicates lamp outage by monitoring a number of lamps with an OR logic circuit having its output coupled to a differential amplifier. The amplifier compares the logic output with a reference and causes the actuation of an indicating device if any lamp fails.

---

The present invention relates to an indicating apparatus, and more particularly to an apparatus for indicating the outage of lamps associated with a vehicle.

Previously no means has been provided in vehicles for indicating the outage of lamps, such as the lamps employed in headlights, tail lights, stop lights, turn signals, etc. To determine whether such lamps are operating properly, one normally inspects the lamps or the light produced thereby. Such inspections normally only occur when a driver notices a lack of light while driving or someone calls the absence of light to the driver's attention. This outage of lamps can be quite dangerous and is a legal violation which may result in the driver being penalized.

An object of the present invention is the provision of an apparatus for indicating the outage of lamps associated with a vehicle. Another object of the invention is the provision of a lamp outage indicating apparatus which may be easily connected to the lighting system of a vehicle. Still another object is the provision of an apparatus for indicating the outage of vehicle lamps, which apparatus is durable and inexpensive.

Other objects and advantages of the present invention will become apparent by reference to the following description and accompanying drawing which is a schematic circuit diagram of an embodiment of the lamp outage indicator in accordance with the present invention.

Briefly, the apparatus shown in the drawing indicates the outage of one or more lamps 10 associated with a vehicle (not shown). In the conventional lighting system of a vehicle, the lamp or lamps 10 are connected through respective normally open switch means 12 to a source of D-C power 14, such as a battery. The lamp outage indicating apparatus includes means 16 for sensing the current supplied to the respective lamps 10, which means provides an output signal in response to a current which is a predetermined amount below the normal current and is de-energized when the switch means 12 associated with the lamp is open. An indicating means 18 is coupled to the output of the sensing means for providing an indication in response to the output signal of the sensing means 16. Thus, the apparatus provides an indication of a current decrease of a predetermined amount from the normal current in the circuit to the lamp when the lamp is connected so that the normal current should flow therethrough.

More particularly, the indicating apparatus is employed to indicate the outage of two lamps 10 of a vehicle such as an automobile, truck, bus, etc. These lamps 10 may be employed in, for example, brake lights, low beam head lights, high beam head lights, back-up lights, tail lights, etc. While only two separate lamps are shown, the indicating apparatus may be employed, as explained hereinafter, to indicate the outage of more than two lamps and/or indicate the outage of lamps connected in parallel.

One side of the respective lamps 10 is connected through the associated normally open switch means 12 to the positive side of the D-C power source 14 which, in the illustrated embodiment, is the battery of the vehicle. The negative side of the battery 14 and the other side of the respective lamps 10 are connected to ground, as is conventional in vehicles. The normally open switch means 12 may be a manually operated switch on the dashboard of the vehicle, a floor switch for selecting the high or low beam head lights, a brake light switch, a relay contact, a static switch, etc.

As shown, the current flowing through the respective lamps 10 is determined by comparing the voltage at one side of a resistor 20 with that on the other side of the resistor, the resistor being connected in series with each lamp between the lamp 10 and the switch 12 associated with that lamp. The resistor 20 is made very small in resistance so as not to cause an excessive voltage drop in series with the lamp.

The voltages at the sides of the respective resistors 20 are sensed by a differential amplifier 22 which preferably has a high input impedance and a high speed of operation. The differential amplifier 22 is provided at its output with an n-p-n transistor switch 24 which is rendered conductive when the voltage at its two inputs 26 and 28 are approximately equal. If there is no voltage applied to the two inputs 26 and 28 or if the voltage at the lower input 28 is a normal amount below the voltage at the upper input 26, then the transistor switch 24 is rendered non-conductive. Such differential amplifiers are commercially available and to reduce costs may be made by integrated circuit techniques.

As shown, the upper input 26 of the differential amplifier 22 is connected to the positive side of the battery 14. The respective junctions between the sensing resistor 20 and the associated lamp 10 are connected through an input 30 of an "or" logic circuit 32 to the lower input 28 of the differential amplifier 22, the input 30 forming a D.C. coupling to the "or" circuit. The "or" circuit 32 is a conventional diode-resistor "or" circuit in which the resistor has a very high resistance and is connected between the output of the diodes at the lower amplifier input and ground.

As shown, the indicating means 18 is a lamp connected in series with the positive side of the battery 14 and the transistor switch 24 at the output of the differential amplifier 24. Thus, when the transistor switch 24 is rendered conductive, the indicating lamp 18 is illuminated. Consequently, any time there is a light outage, the indicator lamp will indicate the same.

In operation, when the switch 12 associated with any lamp 10 is closed and that lamp is in operating condition, the voltage on the lower input 28 of the differential amplifier 22 is at a voltage determined by the current flowing through the sensing resistor 20. Hence, the indicating lamp 18 will not be lit. However, if the lamp 10 is inoperative, the voltage applied to the lower input 28 of the differential amplifier 22 is approximately equal to that of the upper input 26 which is at the voltage of the battery. This causes the indicating lamp to light thereby indicating a lamp outage. If no voltage is applied to either input 26, 28, which occurs when the switch 12 is open, then there is no output from the differential amplifier 22 and the indicating lamp 18 will not be lit.

It should be understood that while only one lamp is connected in series with each switch, one or more additional lamps may be coupled in parallel with the lamp. Also, when lamps are connected in parallel the differential amplifier may be selected so that it senses the reduction in current produced by the outage of one of the lamps.

As can be seen from the above, a lamp outage indicator has been provided which is relatively simple in construction and does not interfere with the normal operation of the lighting system of the vehicle. Also the apparatus can be easily connected to the lighting system of a vehicle.

Various changes and modifications may be made in the disclosed lamp outage indicator without deviating from the spirit or scope of the present invention.

What is claimed is:

1. A system for indicating the outage of at least two lamps, each of which is selectively connectable through a switch to a two terminal source of electric power, said system comprising first and second resistances serially interconnected respectively between each switch and its associated lamp, an OR logic circuit having two inputs, each of said inputs being respectively D.C. coupled across each of said lamps to respond to the voltages thereacross to provide a logic circuit output having one potential when one of said lamps becomes open-circuited and another potential when none of said lamps are open-circuited, a differential amplifier having first and second inputs, said first amplifier input being connected to one terminal of said source as a reference potential, said second amplifier input being connected to the output of said OR logic circuit so that said differential amplifier provides a turn-on signal at its output terminal when the output of said OR logic circuit is at said one potential, said OR logic circuit comprising two rectifier diodes, each respectively connected from each junction of a lamp terminal and its associated series resistance to said second input of the differential amplifier, and a further resistance interconnecting said second input of the amplifier to the other terminal of said source, indicating means for signalling a lamp outage condition, and switching means responsive to said differential amplifier output for controllably coupling said indicating means to the source, whereby the indicating means is energized only when a lamp becomes open-circuited and the switch associated with that lamp is in its on condition.

2. The system of claim 1 wherein said controllable switching means is connected in series circuit relation with said indicating means and said source.

References Cited

UNITED STATES PATENTS

| 3,271,736 | 9/1966 | Brown et al. | 340—253 |
| 3,293,630 | 12/1966 | McKaig | 340—248 |
| 3,084,338 | 4/1963 | Mauer et al. | 340—213 |

THOMAS B. HABECKER, Primary Examiner

HOWARD S. COHEN, Assistant Examiner

U.S. Cl. X.R.
340—251